July 19, 1938.　　　M. C. WHITE　　　2,124,096
FLUID GAUGE
Filed Sept. 21, 1934　　　2 Sheets-Sheet 1
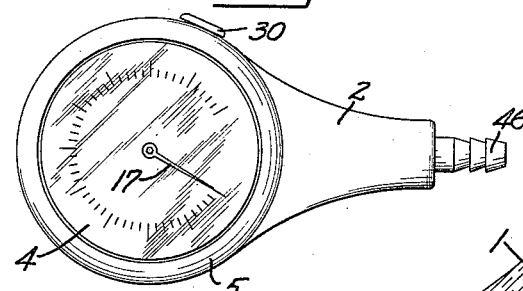
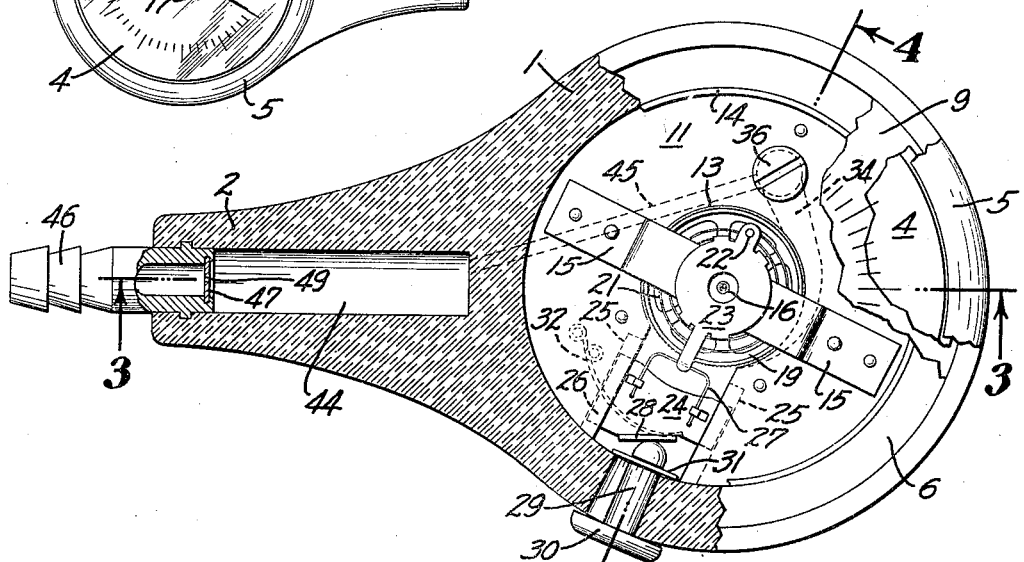
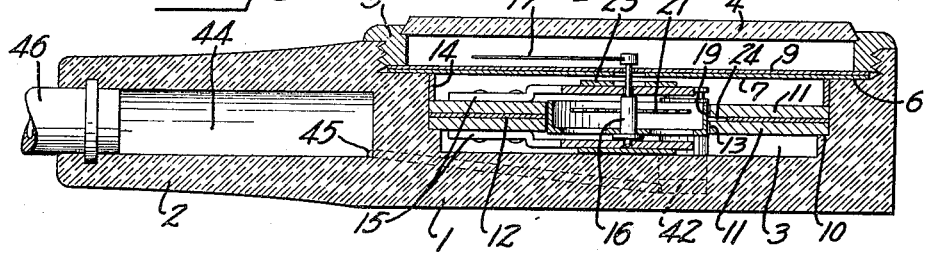
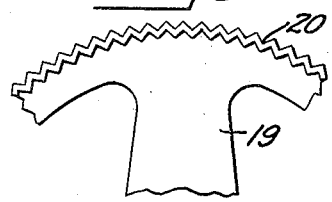
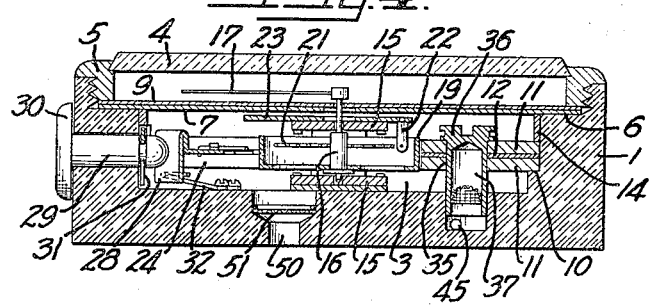
INVENTOR.
MORRIS C. WHITE
BY
ATTORNEYS.

July 19, 1938.  M. C. WHITE  2,124,096
FLUID GAUGE
Filed Sept. 21, 1934  2 Sheets-Sheet 2
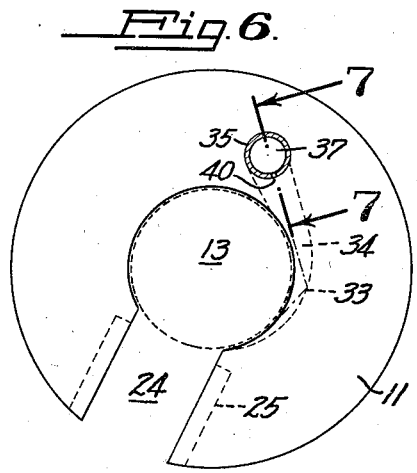
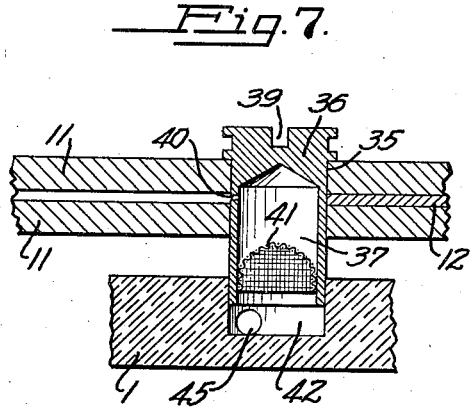
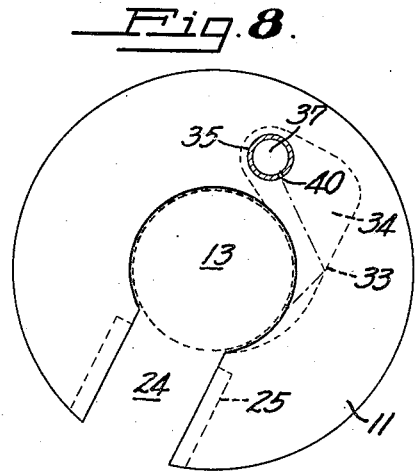
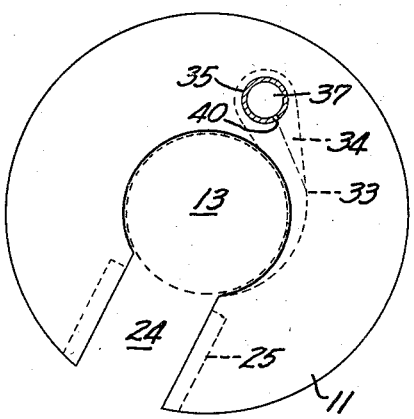
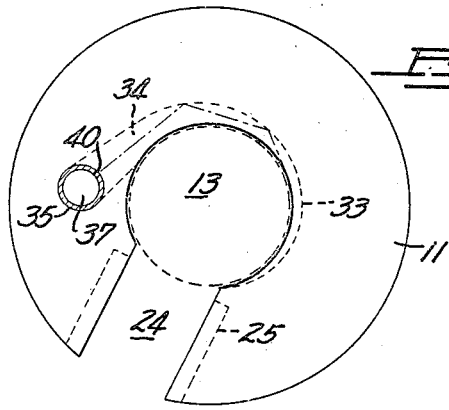
INVENTOR,
MORRIS C. WHITE.
BY
ATTORNEYS.

Patented July 19, 1938

2,124,096

UNITED STATES PATENT OFFICE 2,124,096

FLUID GAUGE

Morris C. White, San Francisco, Calif.

Application September 21, 1934, Serial No. 744,937

10 Claims. (Cl. 253—50)

My invention relates in general to indicating devices, fluid gauges, or flow meters as exemplified in the Bonn Patent No. 1,637,927, issued August 2, 1927. More particularly my invention concerns a fluid gauge or meter for indicating pressures, velocities, and/or volumes of fluids, which when measured vary considerably in value.

While my invention is peculiarly valuable as a gauge for the measuement of air pressure in automobile tires or other air containers, and will be described herein as constructed for that use, it will be apparent that my invention broadly is applicable for the measurement of fluids in general, and is adaptable for metering flow or volume as well as for indicating pressure.

I have therefore shown in the drawings a preferred embodiment of my device designed primarily for the measurement of air pressures in tires.

Figure 1 is a plan view showing the indicating dial.

Figure 2 is an enlarged plan view, portions of the device being cut away, and others shown in section.

Figure 3 is a sectional view taken through a plane indicated by the line 3—3 in Figure 2.

Figure 4 is a sectional view taken through a plane indicated by the line 4—4 in Figure 2.

Figure 5 is a side view in elevation of a portion of the turbine wheel.

Figure 6 is a plan view of the expansion chamber assembly, other parts being removed.

Figure 7 is a sectional view of the jet assembly taken as indicated by the line 7—7 in Figure 6.

Figures 8, 9 and 10 are plan views similar to Figure 6, showing various forms of expansion chambers.

Several factors have combined to defeat the possibility of tire gauges, as heretofore constructed, being precision instruments. High cost would prevent wide spread use, and when such devices are manufactured at a cost which will allow general adoption, they are in general neither accurate, uniform nor adaptable to any wide range of pressures.

As there are now in use tire types which vary in pressure from 12 pounds in the softest balloons to 100 pounds and over in truck tires, it is obvious that a proper gauge should either accurately record the entire range, be adjustable to do so, and always be so made as to be unharmed by high pressures when adjusted to register low pressures, because, in order to service all types of tires, service station air tanks customarily carry pressures exceeding those demanded by the tire of highest pressure.

It is therefore among the objects of my invention: To provide a precision fluid gauge of simple construction; to provide a fluid gauge adjustable to various pressures; to provide a fluid measuring device adaptable to a wide range of values; to provide a fluid measuring device which can be made accurate and uniform at a low cost; to provide surge preventing means for an air gauge; to provide means for changing the form of jet chamber in a jet turbine; to provide a method of uniformly adjusting the response of jet turbine wheels to fluid pressures; to provide a method of controlling the path of a fluid jet between the jet and turbine wheel; and to provide a new and novel means and method of operating a turbine wheel.

Other objects of my invention will be apparent or will be specifically pointed out in the description forming a part of this specification, but I do not limit myself to the embodiment of the invention herein described, as various forms may be adopted within the scope of the claims.

The above objects and other broad aspects of my invention may be more clearly understood by a detailed description of the preferred embodiment thereof herein illustrated.

Referring directly to Figures 1, 2, 3 and 4, a gauge case 1 is provided with a handle portion 2 and a mechanism chamber 3, the latter being closed on one side of the case by case material, and on the other by a transparent face plate 4 held in a bezel 5 screwed to the case.

The chamber 3 is provided with an outer shoulder 6 and a dial plate 7 which together with a dial 9 are clamped between the shoulder 6 and the bezel 5.

The chamber 3 is also provided with an inner shoulder 10 on which is mounted a jet plate assembly which comprises two side plates 11—11 and a central chamber plate 12, all of them pierced with a central aperture 13. The jet plate assembly as a whole is held against the shoulder by a retaining ring 14. Thus all parts so far described are removable by unscrewing the bezel 5.

Firmly attached to the side plates 11—11 are wheel support arms 15—15, centrally pierced to form bearings for a wheel pivot 16, which is extended at one end through the support arm 15, the dial plate 7 and dial 9 and terminates between the dial and the face plate 4. An indicating arm 17 is mounted on the pivot, positioned to sweep around the dial 9.

Mounted also on the pivot 16 is a turbine wheel 19 preferably cup-shaped for lightness, and having a roughened or knurled periphery 20 as shown in Figure 5. This wheel is mounted in the central aperture 13 so that the knurled surface extends approximately an equal distance beyond the plates 11—11. The usual hair spring 21 is fastened on its inner end to the pivot 16 and on the outer end to a spring standard 22 supported by an adjustment disc 23 which rotates on the outer wheel support arm 15. Rotation of the adjustment disc will change the tension of the hair spring and thereby control the restoring force applied to the turbine wheel.

While I prefer to form the side plates 11—11 and the chamber plate 12 in circular form, I also prefer to cut away a portion of the discs in order to form a brake recess 24. By cutting away portions of the chamber plate 12 on each side of the recess 24, I thus form a pair of grooves 25—25 in which a brake traveler 26 may slide. This brake traveler is provided with a brake wire 27, preferably of resilient material in a U shape, and having the legs of the U crimped into the plate 24. The outer edge of the brake plate is bent upon itself to form an angular bearing lip 28 against the outer surface of which a brake pin 29 bears. This brake pin passes through a slot in the wall of the case and is provided on the outside of the case with a brake button 30 and on the inner wall of the case with a retaining washer 31. A brake spring 32 maintains the brake wire out of contact with the wheel, and as the slot through the casing wall is elongated peripherally, sliding the brake button in the slot will force the brake wire against the wheel and stop it in any desired position.

Referring particularly now to Figures 6–10 inclusive, various jet and chamber arrangements can be made whereby air is conducted to the wheel. In Figures 6, 8, 9 and 10 I have indicated by dotted lines 33 the outline of portions which have been cut away from the chamber plate 12 in order to form jet chambers 34 of varying size, shape and outline.

A reference to Figure 7 will show how air is conducted into the jet chambers. The three plates 11—11, and 12 are bored to provide a jet pin aperture 35. In this jet pin aperture is mounted a jet pin 36 which is provided with an internal bore 37 open at one end and a slotted head 39. I prefer to make the pin a tight fit in the aperture but not so tight that it cannot be turned by means of a suitable instrument applied to the slotted top. A jet hole 40 pierces the wall of the pin between the internal bore and the outside in such a location that the jet formed by air passing through the hole will permit air to escape into the jet chambers formed by the cutting away of the chamber plate 12, and thence onto the periphery of the wheel. The jet pin is preferably extended through the plates and beyond the opposite side sufficiently far so that the internal bore 37 may contain a dirt screen 41 and the pin engages a pin cavity 42 in the back wall of the case. This pin cavity is connected with a surge chamber 44 in the handle end of the case by an air duct 45, and the outer end of the surge chamber is closed by means of a hose fitting 46 which is provided at its inner end with a metering plate 47. In this plate is bored a metering aperture 49, preferably of a size approximating that of the jet hole 40. Thus the jet is confined in one direction by parallel faces and in the other by the thin wall of the jet chamber formed by the cutting away of the chamber plate. The back of the case is provided with an exhaust aperture 50, protected by an exhaust screen 51. In operation, a source of air to be tested is connected to the hose fitting 46. Air then passes into the surge chamber 44 relatively slowly, as limited by the metering aperture 49. This surge chamber prevents too rapid application of pressure to the internal mechanism of the gauge and in addition acts as a filter whereby minor, unimportant and transitory variations in the air pressure are not recorded by the gauge.

Assuming that the brake mechanism is in a position to allow the free rotation of the turbine wheel, air will pass through the air passage 45 into the air chamber 42 through the screen 41 and the internal bore 37 in the jet pin 36 and thence through the jet aperture 40 into the jet chamber 34. The air in the jet chamber will then be passed on to the knurled periphery of the turbine wheel in a manner which will be described later, the wheel will be rotated against the tension of the hair spring, and the indicating hand will sweep around the dial to the proper point. When the hand indicates that a steady reading has been obtained the brake button 30 may be actuated to lock the wheel and the gauge may then be removed from the pressure source, showing the pressure. When a new reading is to be made the brake mechanism may be released and the cycle repeated.

One of the fundamental features of the instant invention, however, is the relation between the jet, the walls of the jet chamber, and the periphery of the wheel. While all of my jet chambers preferably have parallel side faces, in Figure 6 I have shown a rather narrow, small jet chamber with the jet hole positioned so that the jet therefrom is directed so that it misses the periphery of the wheel and lands on the far curving wall of the jet chamber from whence it is reflected or deflected onto the periphery of the wheel. In Figure 8 the jet chamber is much enlarged in a direction parallel to a diameter of the wheel over that shown in Figure 6, and the jet is again directed to miss the periphery of the wheel by a much greater margin than in Figure 6 and the length of jet path will be longer. In Figure 9 the jet chamber is open completely around the entire jet path, and the jet here is also directed against the curving back wall of the jet chamber instead of at the wheel itself. In Figure 10 I have shown a jet chamber having a greater peripheral opening on to the wheel periphery, the size of the chamber being reduced very gradually as the chamber lengthens. Here again the jet is directed against the wall of the chamber rather than against the wheel, and the path is such that there may well be several reflections of the air stream before reaching the periphery of the wheel.

The construction of the entire device is such that any one of the chamber plates shown in Figures 6, 8, 9 and 10 or others of still different contour may be quickly susbtituted one for the other in the machine in case they are desired for various purposes. It is also obvious that when any one chamber plate is used in a given machine that turning the jet pin will change the angle of reflection of the air stream and thereby change the effect on the wheel. I have found this latter adjustment extremely valuable in manufacturing large numbers of gauges in quantity production in that it is very simple to adjust all gauges to read the same on given pressures by individual adjustment of the pivot pins, thus giving rise to an output wherein all gauges are identical in their response. I have also found that by varying the angle of the jet with a given jet chamber, that I am able to make the same instrument respond with maximum efficiency to either low pressures or high pressures with, of course, proper regard being taken for the tension of the hair spring. In other words, I am able to make a given instrument extremely sensitive, for low pressures, or extremely insensitive, for high pressures.

Again, I am able to control the response of the instrument by changing the size and shape of the jet chambers. I have found that it is possible to make a wide range instrument which can be adjusted to be extremely sensitive on the low pressures and relatively insensitive at high pressure or, vice versa, make an instrument which is relatively insensitive at the low pressures but extremely sensitive at the high pressures, individual uniformity being made by regulating, usually within slight degrees, the angle of the jet hole with respect to the chamber wall.

Just what the function of the chamber is, apart from the reflection of the stream, I am not prepared at this time to say. I believe, however, that eddies and turbulences are created which may be greater or less at higher or lower pressures, in accordance with the shape of the chamber apart from the actual path of the jet stream itself. I do, however, know that the sensitivity, reliability and adjustability of the device is greatly increased by the use of reflection within the chamber. I also know that the chamber itself does not act, as a whole, as an expansion jet as I have passed oxygen through the device, and by means of properly prepared side walls in the chamber have etched or otherwise indicated the actual path of the stream, and know that I am getting action by reflection and not direct. I also have found that direct application of the jet to the wheel does not accomplish the results described herein.

I have provided, therefore, a device, which, while extremely sensitive to small changes in pressure is sufficiently rugged and strong to not only withstand, but at the same time, indicate heavy pressure. It uses only a very minute quantity of air. This is exemplified by the fact that in one form of tire gauge, which is designed to operate from a source at varying from approximately 110 pounds pressure down to zero, the jet aperture 40 is only seven one thousandths of an inch in diameter. This small air consumption is extremely valuable in measuring the pressure of small containers where large air consumption in the gauge would reduce the air pressure considerably.

Due to the use of the surge chamber, the instrument is practically dead beat, comes to its reading gradually but rapidly, and does not jump. I have also found that by varying the capacity of the surge chamber I can change the rapidity of hand movement, a short chamber giving a rapid rise to the indication, a longer chamber slowing down the rise.

Furthermore, I have found that if the metering aperture 49 is substantially of the same area as the jet hole, no scale disturbance takes place. If, however, the metering aperture be substantially larger or smaller than the jet hole, scale response is varied, particularly in the range intermediate high and low pressures. This factor I may use to still further regulate the response of my wheel, either for extreme accuracy or for special purposes. I have, therefore, complete control of the response of my instrument in the high, low and intermediate ranges.

It should also be understood that velocity and volume scales may be substituted for the pressure scale without departure from the spirit of my invention.

While I have described my invention as applied to an indicating device wherein the rotating turbine wheel is restrained by a counter force, it is obvious that the features of my invention of reflecting the air stream, changing the angle of reflection, replacing chamber plates, and the use of the surge chamber, as well as others mentioned, are all features which can be applied to a continuously or intermittently rotating device operating without restoring force.

I claim:

1. In combination, a turbine wheel having a roughened peripheral driving surface, a removable chamber plate having a cut-out portion receiving said wheel and positioned at right angles thereto, a second cut-out portion opening tangentially onto said wheel, a cover plate on each side of said chamber plate cut out to receive said wheel and forming side walls for said second cut-out portion, and means for delivering a jet of fluid into the chamber thus formed, said latter means being adjustable to vary the jet angle.

2. In combination, a turbine wheel having a roughened peripheral driving surface, a removable chamber plate having a cut-out portion receiving said wheel and positioned at right angles thereto, a second cut-out portion opening tangentially onto said wheel, a cover plate on each side of said chamber plate cut out to receive said wheel and forming side walls for said second cut-out portion, means for delivering a jet of fluid into the chamber thus formed, and means for varying the direction of said jet to regulate response of said wheel.

3. In combination with a turbine wheel actuated by a jet of compressible fluid applied to said wheel through an aperture, an air supply conduit for said aperture having a substantial expanded portion adjacent said aperture and a baffle in said pipe having a metering orifice therein opening into said expanded portion and positioned to control the entrance of fluid thereto, the cross sectional area of said aperture and said orifice being of the same order of magnitude.

4. In combination with a turbine wheel actuated by a jet of compressible fluid applied to said wheel through an aperture, an air supply conduit leading to said aperture, a baffle in said conduit having a metering orifice therein of substantially the same cross sectional area as said aperture, said conduit having a substantial fluid chamber between said orifice and said aperture.

5. In combination, a turbine wheel, a stationary expansion chamber having a wall receding from the periphery of said wheel with a gradually increasing radius of curvature, and a jet of relatively small cross-section as compared to said chamber positioned within said chamber having a bore therein directing a fluid stream against said wall to form a reflection path terminating on said periphery.

6. In combination, a turbine wheel, a stationary expansion chamber having a wall receding from the periphery of said wheel with a gradually increasing radius of curvature, and a jet of relatively small cross-section as compared to said chamber positioned within said chamber having a bore therein directing a fluid stream against said wall to form a reflection path terminating on said periphery, said angle formed being obtuse.

7. In combination, a turbine wheel, a stationary expansion chamber having a wall receding from the periphery of said wheel with a gradually increasing radius of curvature, and an adjustable jet, a relatively small cross-section as compared to said chamber, positioned within said chamber having a bore therein directing a fluid stream against said wall to form a reflection path terminating on said periphery, said angle formed being obtuse and variable in accordance with jet adjustment.

8. In combination, a turbine wheel having a minutely roughened peripheral driving surface, walls adjacent the periphery of said wheel and defining a chamber increasing in size as it approaches said wheel, said chamber enclosing at least a portion of the periphery of said wheel, a jet pin positioned in the smaller end of said chamber and having an axis substantially parallel to the axis of said wheel and a jet aperture formed substantially perpendicular to the axis of said jet pin, and means for rotating said jet pin to vary the angle of said jet with respect to the wall of said expansion chamber.

9. In combination, a turbine wheel having a minutely roughened peripheral driving surface, walls adjacent the periphery of said wheel and defining a chamber increasing in size as it approaches said wheel, said chamber enclosing at least a portion of the periphery of said wheel and having a curvilinear wall receding from said periphery, a jet pin positioned within the smaller end of said chamber substantially parallel to the axis of said wheel and having a jet aperture formed therein substantially in the plane of said wheel, said jet pin being rotatably adjustable to direct a jet against a selected portion of said curvilinear chamber wall.

10. In combination, a turbine wheel having a minutely roughened peripheral driving surface, walls adjacent the periphery of said wheel and defining a chamber increasing in size as it approaches said wheel, said chamber enclosing at least a portion of the periphery of said wheel and having a wall receding from said periphery with a gradually increasing radius of curvature, a jet pin positioned within the smaller end of said chamber substantially parallel to the axis of said wheel and having a jet aperture formed therein substantially in the plane of said wheel, said jet pin being rotatably adjustable to direct a jet against a selected portion of said curvilinear chamber wall.

MORRIS C. WHITE.